H. A. BRANDENBURGER.
TIRE.
APPLICATION FILED MAY 27, 1911.
1,031,416.
Patented July 2, 1912.
3 SHEETS—SHEET 1.
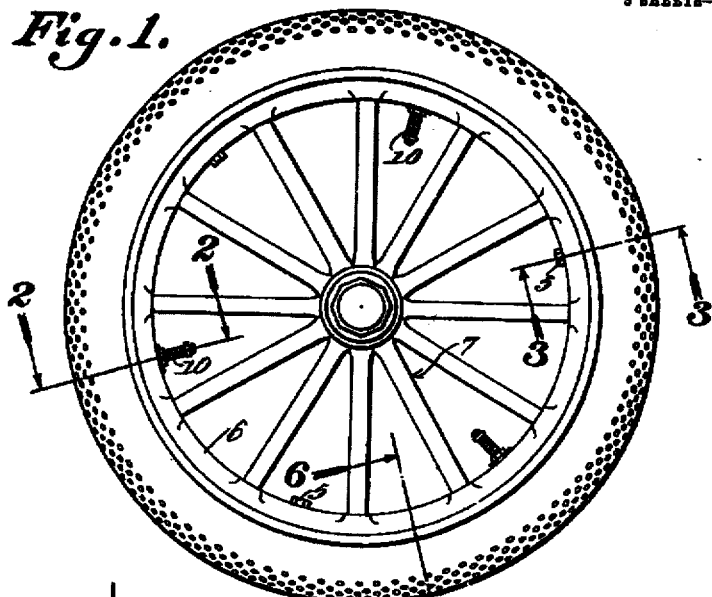
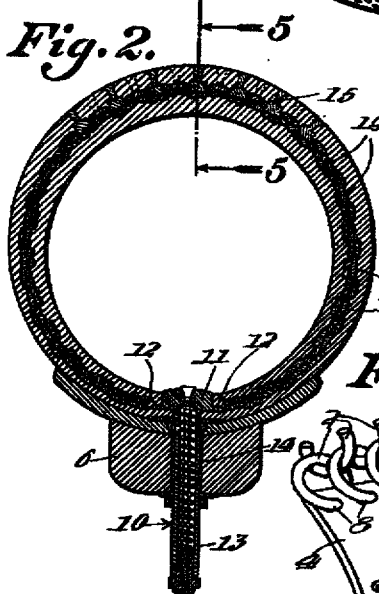
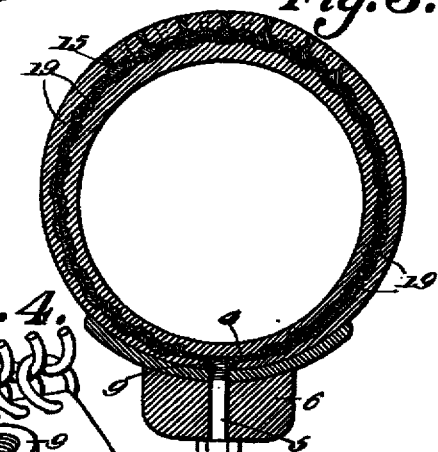
Witnesses:
Lottie M. Fox.
Bertha von Behrens
Inventor:
Herman A. Brandenburger,
By Hugh K. Wagner,
His Attorney.

H. A. BRANDENBURGER.
TIRE.
APPLICATION FILED MAY 27, 1911.
1,031,416.
Patented July 2, 1912.
3 SHEETS—SHEET 2.
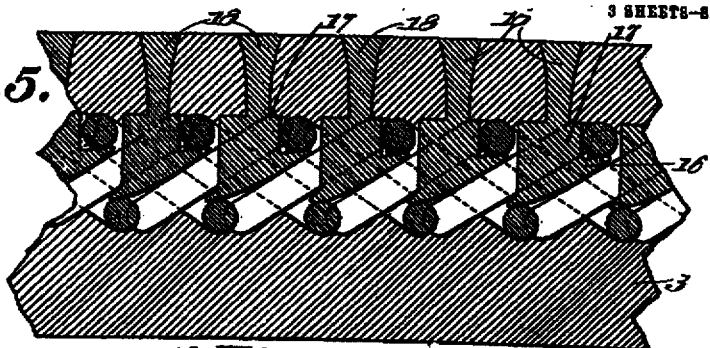
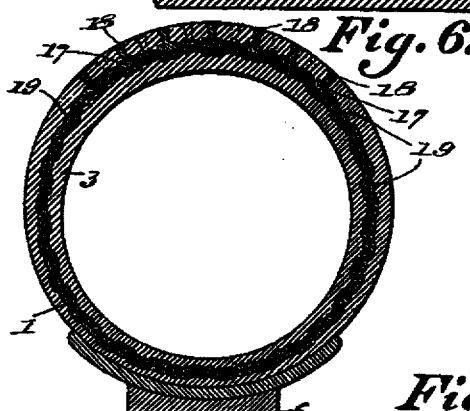
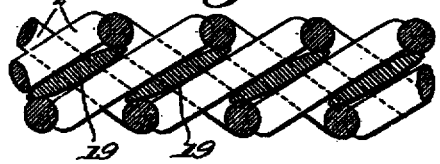
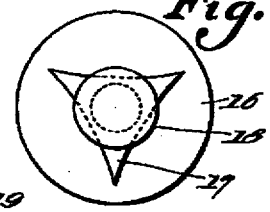
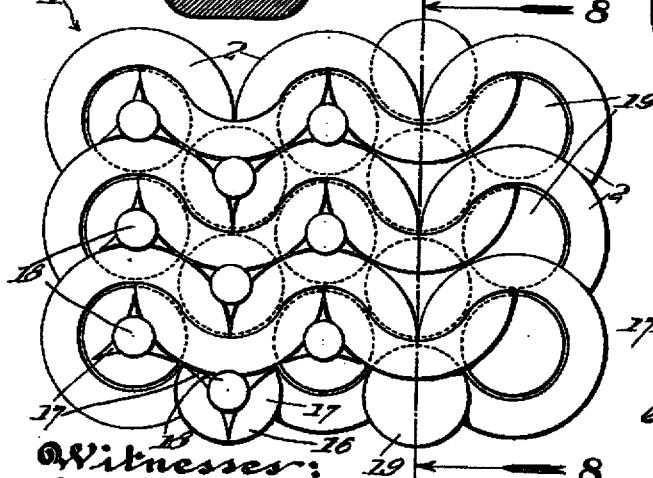
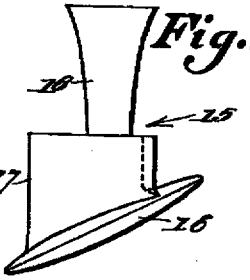
Witnesses:
Lottie M. Fox.
Bertha von Behrens.
Inventor:
Herman A. Brandenburger,
By Hugh K. Wagner
His Attorney.

H. A. BRANDENBURGER.
TIRE.
APPLICATION FILED MAY 27, 1911.
1,031,416.
Patented July 2, 1912.
3 SHEETS—SHEET 3.
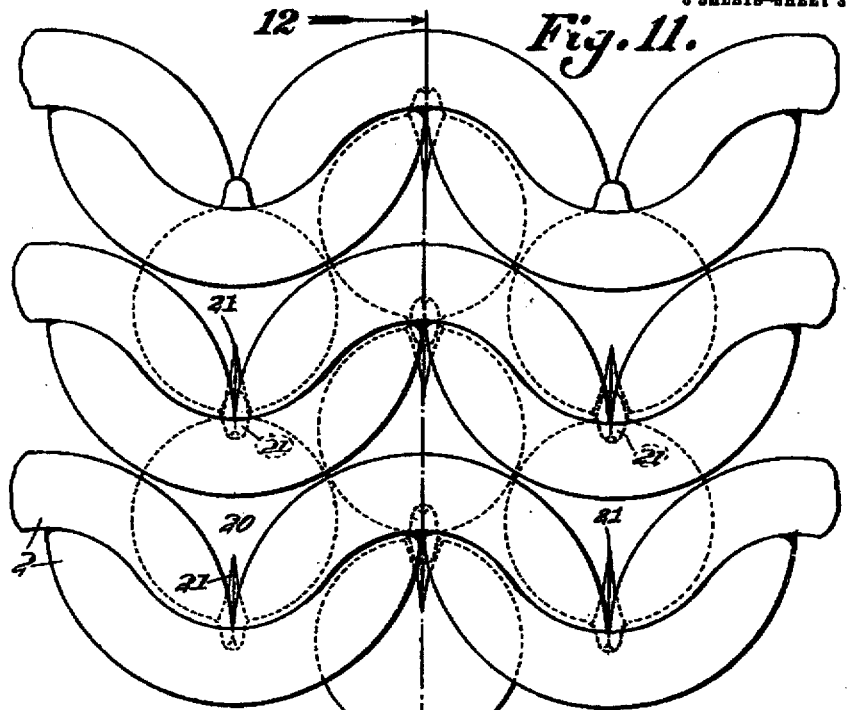
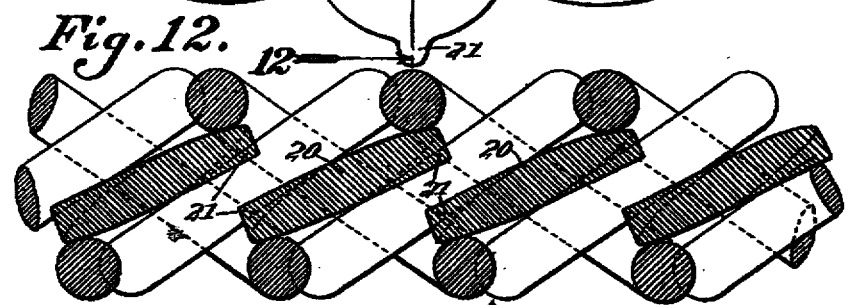
Witnesses:
Lottie M. Fox.
Bertha von Behrens.
Inventor:
Herman A. Brandenburger,
By Hugh N. Wagner
His Attorney.

UNITED STATES PATENT OFFICE.

HERMAN A. BRANDENBURGER, OF ST. LOUIS, MISSOURI.

TIRE.

1,031,416.

Specification of Letters Patent.

Patented July 2, 1912.

Application filed May 27, 1911. Serial No. 629,835.

*To all whom it may concern:*

Be it known that I, HERMAN A. BRANDENBURGER, a citizen of the United States, residing at the city of St. Louis, State of Missouri, have invented certain new and useful Improvements in Tires, of which the following is a specification.

The present invention has reference to protective armor for automobile tires, and more especially to that type of armor which consists of a flexible metallic fabric adapted to be embedded in the body of the tire.

It comprehends, primarily, certain improvements, hereinafter described at length, in or relating to the construction of the fabric proper, and the filling pieces with which the latter is furnished.

A structural embodiment of the invention is illustrated in the accompanying drawings, wherein:—

Figure 1 is a face view of an automobile wheel equipped with a tire constructed in accordance with said invention, Figs. 2 and 3 are enlarged sections taken on the lines 2—2 and 3—3 of Fig. 1, Fig. 4 is a perspective view of one of the plates employed in conjunction with the bolts for fastening the tire to the felly of the wheel, Figs. 5 and 6 are enlarged sections taken, respectively, on the lines 5—5 of Fig. 2 and 6—6 of Fig. 1, Fig. 7 is a plan view of a portion of the fabric, Fig. 8 is a section taken on the line 8—8 of Fig. 7, Figs. 9 and 10 are, respectively, a plan view and a side elevation of one of the filling pieces that are employed in the tread portion of the armor. Fig. 11 is a plan view of a fabric equipped with a modified form of filling piece, Fig. 12 is a section taken on the line 12—12 of Fig. 11, and Fig. 13 is a perspective view of one of the modified filling pieces.

As shown in said drawings, the fabric proper 1 is composed of series of rows of rings 2 connected or interwoven together in much the same manner as the rings of a so-called coat of chain mail. The fabric is in the form of a continuous band which is embedded in the body of the tire proper 3 during the construction thereof, and is provided at suitable intervals with plates 4, to which the bolts 5 that are employed to fasten the tire to the felly 6 of the wheel proper 7 are secured. These plates are preferably of the type shown in Fig. 4; that is to say, they are provided along their opposite longitudinal edges with rows of perforations 8 in which the rings 2 are linked, and they are also provided with centrally-located internally-threaded tubular bosses 9 wherein the inner ends of said bolts 5 are engaged.

The valves 10 employed in conjunction with the tire are connected to the metal fabric in much the same manner as the plates and bolts just described. The enlarged head portions 11 of the valves are embedded in the tire body, as shown in Fig. 2, and the rings are joined to the flanges 12 formed upon said heads, the valve bodies 13 projecting through openings 14 in the felly 6.

The interstices between mutually-connected rings are designed to receive filling pieces, which latter are preferably of two kinds, as illustrated in Fig. 7. The filling pieces 15 which are arranged in the tread portion of the tire are shown in detail in Figs. 9 and 10. They consist of double convex disks 16 adapted to be embedded in the meshes of the fabric and formed upon their outer faces with substantially triangular lugs 17 whose sides are curved to fit snugly against the portions of the rings directly adjacent thereto, thereby to fill the triangular interstices and, also, to hold said rings against movement in the rubber tire body. The outer ends of the lugs 17 are formed, in turn, with longitudinal projections 18, which are substantially triangular in shape and are designed to extend to the tread of the tire, so as to afford additional wearing surface therefor. The filling pieces 19 that are arranged along the side or longitudinal edge portions of the fabric are likewise constituted by double convex disks which are similar to the disk portion 16 of the tread filling pieces. These disks are held in place solely by the rings themselves, the latter being so closely interwoven as to require no extraneous retaining means.

In place of the filling pieces 15 and 19, those shown in Figs. 11 to 13 may be used, if desired. The modified disks, which are indicated by the reference numeral 20, are each formed at diametrically opposite points with a pair of wedge-like projections 21, one of such projections being located upon one face of the disk and the other projection upon the opposite face. Said projections are designed to fill the small interstices between the rings above and below the peripheries of the disks so as to retain the disks more securely in position.

The completed fabric, as will be understood from the foregoing, is of tubular conformation when completed, the inner edges of the fabric being left detached, however, until both sides of said fabric are covered with rubber, after which said edges are connected to the valve heads 11 and plates 4 and attached to each other at the points between those parts; the joint may then be vulcanized. The tire thus formed will be strengthened to a great extent by the embedded fabric, and especially at its tread portion, by reason of the extension of the projections 18 of the filling pieces 15 to the surface of that portion. The employment of the filling pieces results in the formation of a practically continuous metal fabric, the requisite flexibility of which, nevertheless, is not impaired.

What I claim is:

1. Protective armor for tires comprising a band of chain fabric and double convex filling disks inserted wholly in the interstices.

2. Protective armor for tires comprising a band of chain fabric and filling disks inserted in the interstices, said disks having projections formed thereon.

3. Protective armor for tires comprising a band of chain fabric and double convex filling disks inserted wholly in the interstices, said disks having projections formed thereon.

4. Protective armor for tires comprising a band of chain fabric and filling disks inserted in the interstices, certain of said disks being formed with outwardly projecting triangular lugs having their sides curved to fit snugly against the chain members directly adjacent thereto.

5. Protective armor for tires comprising a band of chain fabric and filling disks inserted in the interstices, certain of said disks being formed with outwardly projecting lugs provided with longitudinal projections.

6. Protective armor for tires comprising a band of chain fabric and filling disks inserted in the interstices, certain of said disks being formed with outwardly projecting triangular lugs having their sides curved to fit snugly against the chain members directly adjacent thereto, said lugs being provided with longitudinal projections.

7. Protective armor for tires comprising a band of chain fabric and filling disks inserted in the interstices, said disks having projections formed upon their opposite faces.

8. Protective armor for tires comprising a band of chain fabric and filling disks inserted in the interstices, said disks having wedge-shaped projections formed thereon.

9. Protective armor for tires comprising a band of chain fabric and filling disks inserted in the interstices, said disks having wedge-shaped projections formed on their opposite faces.

10. Protective armor for tires comprising a continuous tubular band of chain fabric having its side edges connected together, and filling disks inserted in the interstices, the disks in the tread portion of said band being formed with outwardly projecting lugs.

11. Protective armor for tires comprising a continuous tubular band of chain fabric having its side edges connected together, and double convex filling disks inserted wholly in the interstices, the disks in the tread portion of said band being formed with outwardly projecting lugs.

12. Protective armor for tires comprising a continuous tubular band of chain fabric having its side edges connected together, and filling disks inserted in the interstices and having convex outer faces, the disks in the tread portion of said band being formed with outwardly projecting lugs.

13. A fabric comprising a body of rubber, and a band embedded therein and consisting of interwoven rings having filling disks inserted in the interstices therebetween.

In testimony whereof I hereunto affix my signature in the presence of two witnesses.

HERMAN A. BRANDENBURGER.

Witnesses:
LOTTIE M. FOX,
BERTHA VON BEHRENS.

Copies of this patent may be obtained for five cents each, by addressing the "Commissioner of Patents, Washington, D. C."